United States Patent
Malloy et al.

(10) Patent No.: US 9,549,030 B2
(45) Date of Patent: Jan. 17, 2017

(54) CORRELATING INPUT AND OUTPUT REQUESTS BETWEEN CLIENT AND SERVER COMPONENTS IN A MULTI-TIER APPLICATION

(75) Inventors: Patrick Malloy, Washington, DC (US); Peter Anthony Crosby, Edmond, OK (US); Robert Meagher, Greenfield, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 1201 days.

(21) Appl. No.: 13/365,484

(22) Filed: Feb. 3, 2012

(65) Prior Publication Data

US 2012/0246287 A1    Sep. 27, 2012

Related U.S. Application Data

(60) Provisional application No. 61/439,662, filed on Feb. 4, 2011.

(51) Int. Cl.
*G06F 7/00* (2006.01)
*G06F 15/173* (2006.01)
(Continued)

(52) U.S. Cl.
CPC ............. *H04L 67/22* (2013.01); *H04L 69/162* (2013.01); *G06F 2201/865* (2013.01); *G06F 2201/87* (2013.01)

(58) Field of Classification Search
CPC ...... H04L 69/162; H04L 67/22; H04L 43/022; H04L 43/028; G06F 11/349; G06F 11/3409; G06F 2201/865; G06F 2201/87; G06F 11/3466
(Continued)

(56) References Cited

U.S. PATENT DOCUMENTS 5,168,554 A * 12/1992 Luke ............................. 715/209
5,717,911 A *  2/1998 Madrid ............. G06F 17/30433
(Continued)

OTHER PUBLICATIONS

Kawaguchi, Kohsuke. "Fingerprint", Aug. 15, 2014, pp. 1 and 2, accessed on May 12, 2015 (https://wiki.jenkins-ci.org/display/JENKINS/Fingerprint).*

(Continued)

*Primary Examiner* — Daniel C Murray
(74) *Attorney, Agent, or Firm* — Park, Vaughan, Fleming & Dowler LLP; Laxman Sahasrabuddhe

(57) ABSTRACT

The present invention relates to correlating requests between a client and a server to a particular transaction. In one embodiment, transactions in a system of clients and servers are monitored and traced. From this information, a context comprising sets or groupings of transaction call sequences are determined. For example, a sequence of method calls on a client process is traced to a socket carrying data for transmission of a request message to a server. In response to this request message, the server then executes a set of method calls that can be correlated to the request message and the socket. This set of actions is considered part of a causally related grouping, and thus, associated together. In one embodiment, HTTP requests from a client may be comprise a unique custom header that is readily identified and traced. For other protocols, a client socket is associated with a corresponding server socket or to data received over a socket receive call.

28 Claims, 2 Drawing Sheets

(51) Int. Cl.
  *G06F 17/30* (2006.01)
  *H04L 29/08* (2006.01)
  *H04L 29/06* (2006.01)

(58) Field of Classification Search
  USPC .......................................... 709/223; 707/711
  See application file for complete search history.

(56) References Cited

U.S. PATENT DOCUMENTS

| | | | |
|---|---|---|---|
| 5,754,774 A * | 5/1998 | Bittinger et al. .............. 709/203 |
| 5,892,900 A * | 4/1999 | Ginter et al. .................... 726/26 |
| 5,973,626 A * | 10/1999 | Berger ..................... H03M 7/42 |
| | | | 341/106 |
| 6,003,079 A * | 12/1999 | Friedrich et al. ............. 709/224 |
| 6,021,439 A * | 2/2000 | Turek et al. .................... 709/224 |
| 6,041,332 A * | 3/2000 | Miller et al. |
| 6,324,548 B1 * | 11/2001 | Sorenson ............ G06F 11/1469 |
| | | | 707/648 |
| 6,411,604 B1 | 6/2002 | Brockman et al. |
| 6,732,248 B2 * | 5/2004 | Chang ................. G06F 17/3061 |
| | | | 707/E17.058 |
| 6,761,636 B2 * | 7/2004 | Chung et al. .................... 463/42 |
| 7,290,048 B1 * | 10/2007 | Barnett et al. ................. 709/223 |
| 7,318,064 B2 | 1/2008 | Patterson |
| 7,392,266 B2 * | 6/2008 | Barsness ........... G06F 17/30336 |
| 7,401,141 B2 * | 7/2008 | Carusi et al. ................. 709/224 |
| 7,433,955 B2 * | 10/2008 | Block et al. ................... 709/227 |
| 7,539,669 B2 * | 5/2009 | Broker .............. G06F 17/30973 |
| 7,577,701 B1 * | 8/2009 | Johns et al. ................... 709/203 |
| 7,593,400 B2 * | 9/2009 | Zelig .................. H04L 12/4625 |
| | | | 370/389 |
| 7,631,073 B2 * | 12/2009 | Chagoly et al. .............. 709/224 |
| 7,730,045 B2 * | 6/2010 | Barsness ........... G06F 17/30336 |
| | | | 707/688 |
| 7,734,775 B2 * | 6/2010 | Barnett et al. ................. 709/224 |
| 7,752,183 B2 * | 7/2010 | Patterson ...................... 707/697 |
| 7,826,487 B1 * | 11/2010 | Mukerji et al. .............. 370/477 |
| 7,860,799 B2 * | 12/2010 | Russell et al. ................. 705/52 |
| 7,873,594 B2 * | 1/2011 | Harada et al. ................. 707/603 |
| 7,886,059 B2 * | 2/2011 | Block et al. ................... 709/227 |
| 7,904,488 B2 * | 3/2011 | Hood .................... G06F 9/4435 |
| | | | 707/705 |
| 7,934,003 B2 * | 4/2011 | Carusi et al. ................. 709/228 |
| 7,953,850 B2 * | 5/2011 | Mani et al. .................... 709/224 |
| 7,958,163 B2 * | 6/2011 | Brentano et al. ............. 707/805 |
| 8,146,095 B2 * | 3/2012 | Gale et al. .................... 719/313 |
| 8,266,097 B2 * | 9/2012 | Harada et al. ................ 707/603 |
| 8,271,452 B2 * | 9/2012 | Longshaw .......... G06F 11/1471 |
| | | | 707/664 |
| 8,386,503 B2 * | 2/2013 | Benson ............. G06F 17/30011 |
| | | | 707/758 |
| 8,423,973 B2 * | 4/2013 | Saunders et al. ............. 717/130 |
| 8,478,304 B1 * | 7/2013 | David ................... H04W 48/18 |
| | | | 455/435.1 |
| 8,495,006 B2 * | 7/2013 | Harada et al. ................ 707/603 |
| 8,499,009 B2 * | 7/2013 | Brentano et al. ............. 707/805 |
| 8,521,868 B2 * | 8/2013 | Ben-Yehuda et al. ........ 709/224 |
| 8,528,061 B1 * | 9/2013 | Davis .................... H04L 63/123 |
| | | | 726/1 |
| 8,549,540 B1 * | 10/2013 | Dixon et al. ................... 719/314 |
| 8,578,017 B2 * | 11/2013 | Cobb et al. .................... 709/224 |
| 8,667,147 B2 * | 3/2014 | Mani et al. .................... 709/228 |
| 8,683,489 B2 * | 3/2014 | Dixon et al. ................... 719/314 |
| 8,924,973 B2 * | 12/2014 | Arcese et al. .................... 718/1 |

| | | | |
|---|---|---|---|
| 2002/0128065 A1 * | 9/2002 | Chung et al. ................... 463/42 |
| 2003/0005217 A1 * | 1/2003 | Chang ................. G06F 17/3061 |
| | | | 711/111 |
| 2003/0165162 A1 * | 9/2003 | Westphal ...................... 370/477 |
| 2004/0049693 A1 * | 3/2004 | Douglas ........................ 713/200 |
| 2004/0103193 A1 * | 5/2004 | Pandya et al. ................ 709/224 |
| 2004/0103196 A1 * | 5/2004 | Block et al. ................... 709/227 |
| 2004/0122942 A1 * | 6/2004 | Green et al. .................. 709/224 |
| 2005/0021736 A1 * | 1/2005 | Carusi et al. ................. 709/224 |
| 2005/0033774 A1 * | 2/2005 | Brentano et al. ............. 707/200 |
| 2005/0039186 A1 * | 2/2005 | Borkan ......................... 719/310 |
| 2005/0083917 A1 * | 4/2005 | Okamoto et al. ............. 370/352 |
| 2005/0132232 A1 * | 6/2005 | Sima ............................. 713/201 |
| 2005/0160078 A1 * | 7/2005 | Benson ............. G06F 17/30011 |
| 2005/0251574 A1 * | 11/2005 | Chagoly et al. .............. 709/227 |
| 2005/0289231 A1 * | 12/2005 | Harada et al. ................ 709/224 |
| 2006/0020578 A1 * | 1/2006 | Hood .................... G06F 9/4435 |
| 2006/0095395 A1 * | 5/2006 | Patterson .......................... 707/1 |
| 2006/0117091 A1 * | 6/2006 | Justin ............................ 709/217 |
| 2006/0179035 A1 * | 8/2006 | Broker .............. G06F 17/30973 |
| 2006/0212264 A1 * | 9/2006 | Barsness ........... G06F 17/30336 |
| | | | 702/182 |
| 2007/0220051 A1 * | 9/2007 | Brentano et al. ........... 707/104.1 |
| 2007/0268915 A1 * | 11/2007 | Zelig .................. H04L 12/4625 |
| | | | 370/401 |
| 2007/0271216 A1 * | 11/2007 | Patterson .......................... 707/1 |
| 2007/0282882 A1 * | 12/2007 | Agarwal ............ G06Q 30/0603 |
| 2007/0288490 A1 * | 12/2007 | Longshaw .......... G06F 11/1471 |
| 2008/0027750 A1 * | 1/2008 | Barkeloo ................ G06F 21/10 |
| | | | 705/26.1 |
| 2008/0059625 A1 * | 3/2008 | Barnett et al. ................. 709/223 |
| 2008/0098041 A1 * | 4/2008 | Chidambaran ..... G06F 17/3056 |
| 2008/0098173 A1 * | 4/2008 | Chidambaran ..... G06F 17/3048 |
| | | | 711/118 |
| 2008/0127208 A1 * | 5/2008 | Bedi et al. ..................... 719/313 |
| 2008/0127209 A1 * | 5/2008 | Gale et al. ..................... 719/313 |
| 2008/0162656 A1 * | 7/2008 | Block et al. ................... 709/206 |
| 2008/0262797 A1 * | 10/2008 | Carusi et al. ................. 702/186 |
| 2010/0088404 A1 * | 4/2010 | Mani et al. .................... 709/224 |
| 2010/0094990 A1 * | 4/2010 | Ben-Yehuda et al. ........ 709/224 |
| 2010/0287541 A1 * | 11/2010 | Saunders et al. ............. 717/139 |
| 2011/0087630 A1 * | 4/2011 | Harada et al. ................ 707/603 |
| 2011/0113117 A1 * | 5/2011 | Genest et al. ................ 709/217 |
| 2011/0167156 A1 * | 7/2011 | Mani et al. .................... 709/224 |
| 2012/0102001 A1 * | 4/2012 | Longshaw .......... G06F 11/1471 |
| | | | 707/662 |
| 2012/0144381 A1 * | 6/2012 | Brentano et al. ............. 717/170 |
| 2012/0151488 A1 * | 6/2012 | Arcese et al. ................. 718/101 |
| 2012/0317072 A1 * | 12/2012 | Harada et al. ................ 707/603 |
| 2013/0174156 A1 * | 7/2013 | Arcese et al. .................... 718/1 |
| 2014/0006606 A1 * | 1/2014 | Dixon et al. ................... 709/224 |
| 2014/0136693 A1 * | 5/2014 | Greifeneder et al. ........ 709/224 |
| 2015/0032884 A1 * | 1/2015 | Greifeneder et al. ........ 709/224 |

OTHER PUBLICATIONS

IBM, "PerformanceApplication Response Management Instrumentation Guide Ver. 5.3", IBM Tivoli Monitoring for Transaction PerformanceApplication, Feb. 1, 2005, URL: http://publib.boulder.ibm.com/tividd/td/ITMFTP/SC32-9412-00/en_US/HTML/arm14.htm.

International Search Report and Written Opinion for PCT/US2012/023725 mailed Jul. 11, 2011.

"Application Response Measurement (ARM) Instrumentation Guide," Version 5.3, IBM Tivoli Monitoring for Transaction Performance, Feb. 2005; 82 pages.

* cited by examiner

CORRELATING INPUT AND OUTPUT REQUESTS BETWEEN CLIENT AND SERVER COMPONENTS IN A MULTI-TIER APPLICATION

CROSS-REFERENCE TO RELATED APPLICATIONS

This application claims the benefit of priority of U.S. Provisional Application No. 61/439,662, filed Feb. 4, 2011, entitled "Correlating Input an Output Requests between Client and Server Components in a Multi-Tier Application," which is incorporated by reference in its entirety.

BACKGROUND

Application performance management relates to technologies and systems for monitoring and managing the performance of applications. For example, application performance management is commonly used to monitor and manage transactions performed by an application running on a server to a client.

Today, many applications can be accessed over a network, such as the Internet or intranet. For example, due to the ubiquity of web browsers on most client devices, web applications have become particularly popular. Web applications typically employ a browser-supported infrastructure, such as Java or a .NET framework. However, the performance of these types of applications is difficult to monitor and manage because of the complexity of the software and hardware and numerous components that may be involved.

A transaction typically comprises a sequence of method calls in a program that represent a complete set of operations necessary to perform a self-contained unit of work, such as a web request or a database query. Transactions can be traced to monitor and manage their performance. For example, a trace can be performed in an application server to obtain detailed information about the execution of an application within that server.

Unfortunately, the tracing of a transaction through a typical network system is difficult. For example, even when several network-connected interoperating components of a multi-tier application are all instrumented, the known application monitoring systems and methods are unable to correlate transaction call sequences from those components that are causally related. These communications are difficult to correlate because they are independently running on the client and server. In addition, the common use of network address translation makes tracing these communications difficult.

In some known systems, for hypertext transport protocol (HTTP) based requests, it is possible to insert a unique custom header on the client side into an outgoing HTTP request message, and to intercept this custom header on the server side. If each side of the transaction (i.e., the client and server) is tracing calls, the custom header associated with the HTTP request can be recorded to the trace files on each side of each request and response. The associated calls can later be correlated based on this custom information.

Unfortunately, for cross-tier communications that are not encapsulated as HTTP requests and responses, it is generally not possible to insert such additional context into the messages.

Furthermore, in a traditional transaction trace for web applications, Java or .NET instrumentation components are running (on the application server, the client, etc.) and write records of all of the method calls of a transaction to a transaction trace file. Such tracing must be predominantly initiated manually or triggered by a program condition and for only a limited period of time. It is necessary to limit trace duration and detail in the conventional systems because the act of tracing is relatively expensive and could negatively system performance and disk space of the server, the client, etc.

Accordingly, this also means that in many circumstances the execution of an application within a system cannot be diagnosed or monitored regardless of whether the communications are HTTP based or not.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1:
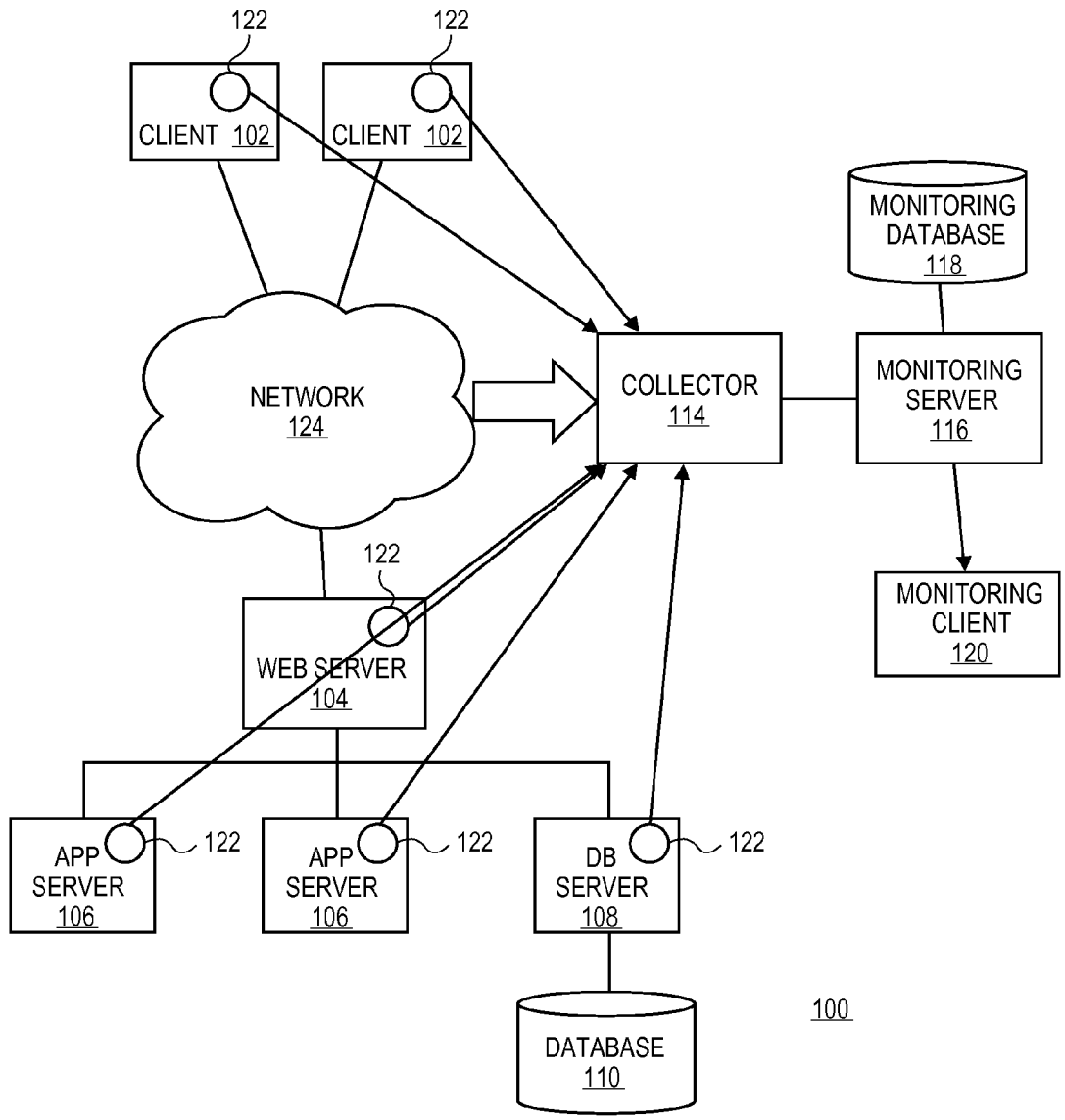
FIG. 1 illustrates an exemplary system in accordance with the embodiments.

The embodiments relate to monitoring and managing applications, such as web applications running via the hardware and software in a network infrastructure. In particular, the embodiments provide a framework for tracing as many transactions as possible in real-time and correlating the traces across multiple tiers and components. In one embodiment, whenever possible, the application performance management systems and methods will attempt to trace every call in every transaction, while maintaining a low overhead and minimizing the impact on system performance. In one embodiment, a throughput manager manages the tradeoff between performance and completeness of detail harvested by the tracing.

In addition, one embodiment provides methods and systems for correlating the trace information across multiple tiers and components supporting an application. For example, in one embodiment, the system gathers the various transaction trace files. Various network-connected interoperating components of a multi-tier application may all be instrumented and producing transaction traces. The system correlates transaction call sequences from those components that are causally related even if the transaction spans across multiple tiers of the application. In particular, the system can associate a client socket with the corresponding server socket in pairs of trace files and associate the data transmitted with a specific socket send call with data received by a corresponding socket receive call.

For example, a sequence of transaction method calls on a client process may lead to a socket-based data transmission of a request message from the client to a server. The server, having received the data transmission, may analyze the data and make a subsequent sequence of method calls to fulfill the request. Then, the server may in turn send its response data transmission to the waiting client, which continues its activity. Because the send method of the client which transmits the request message is causally related to the receive method which receives the request, the system can associate the call sequences on both the client and server based on data transmissions that the sequences have in common.

In the following description, for purposes of explanation rather than limitation, specific details are set forth such as the particular architecture, interfaces, techniques, etc., in order to provide an understanding of the concepts of the invention. However, it will be apparent to those skilled in the art that the present invention may be practiced in other embodiments, which depart from these specific details.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. For example, for purposes of simplicity and clarity, detailed descriptions of well-known components, such as circuits, are omitted so as not to obscure the description of the present invention with unnecessary detail. To illustrate some of the embodiments, reference will now be made to the figures.

FIG. 1 illustrates an exemplary system to support a multi-tier application and an application performance management system. As shown, the system 100 may comprise various components or nodes including, among other things, a set of clients 102, a web server 104, application servers 106, a database server 108, a database 110, and application performance management system 112. The application performance management system 112 may comprise a collector 114, a monitoring server 116, and a monitoring database 118. The application performance management system 112 may also be accessed via a monitoring client 120. These components will now be further described.

Clients 102 refer to any device requesting and accessing services of applications provided by system 100. Clients 102 may be implemented using known hardware and software, such as a processor, a memory, communication interfaces, an operating system, application software, etc. For example, clients 102 may be implemented on a personal computer, a laptop computer, a tablet computer, a smart phone, and the like. Such devices are known to those skilled in the art and may be employed in one embodiment.

The clients 102 may access various applications based on client software running or installed on the clients 102. The clients 102 may execute a thick client, a thin client, or hybrid client. For example, the clients 102 may access applications via a thin client, such as a browser application like Internet Explore, Firefox, etc. Programming for these thin clients may include, for example, JavaScript/AJX, JSP, ASP, PHP, Flash, Silverlight, and others. Such browsers and programming code are known to those skilled in the art.

Alternatively, the clients 102 may execute a thick client, such as a stand-alone application, installed on the clients 102. Programming for thick clients may be based on the .NET framework, Java, Visual Studio, etc.

Web server 104 provides content for the applications of system 100 over a network, such as network 124. Web server 104 may be implemented using known hardware and software, such as a processor, a memory, communication interfaces, an operating system, etc. to deliver application content. For example, web server 104 may deliver content via HTML pages and employ various IP protocols, such as HTTP.

Application servers 106 provide a hardware and software environment on which the applications of system 100 may execute. In one embodiment, application servers 106 may be implemented as a Java Application Server, a Windows Server implementing a .NET framework, LINUX, UNIX, WebSphere, etc. running on known hardware platforms. Application servers 106 may be implemented on the same hardware platform as the web server 104, or as shown in FIG. 1, they may be implemented on their own hardware.

In one embodiment, application servers 106 may provide various applications, such as mail, word processors, spreadsheets, point-of-sale, multimedia, etc. Application servers 106 may perform various transaction related to requests by the clients 102. In addition, application servers 106 may interface with the database server 108 and database 110 on behalf of clients 102, implement business logic for the applications, and other functions known to those skilled in the art.

Database server 108 provides database services access to database 110 for transactions and queries requested by clients 102. Database server 108 may be implemented using known hardware and software, such as a processor, a memory, communication interfaces, an operating system, etc. For example, database server 108 may be implemented based on Oracle, DB2, Ingres, SQL Server, MySQL, and etc. software running on the server 108.

Database 110 represents the storage infrastructure for data and information requested by clients 102. Database 110 may be implemented using known hardware and software, such as a processor, a memory, communication interfaces, an operating system, etc. For example, database 110 may be implemented as a relational database based on known database management systems, such as SQL, MySQL, etc. Database 110 may also comprise other types of databases, such as, object oriented databases, XML databases, and so forth.

Application performance management system 112 represents the hardware and software used for monitoring and managing the applications provided by system 100. As shown, application performance management system 112 may comprise a collector 114, a monitoring server 116, a monitoring database 118, a monitoring client 120, and agents 122. These components will now be further described.

Collector 114 collects application performance information from the components of system 100. For example, collector 114 may receive information from clients 102, web server 104, application servers 106, database server 108, and network 124. The application performance information may comprise a variety of information, such as trace files, system logs, etc. Collector 114 may be implemented using known hardware and software, such as a processor, a memory, communication interfaces, an operating system, etc. For example, collector 114 may be implemented as software running on a general-purpose server. Alternatively, collector 114 may be implemented as an appliance or virtual machine running on a server.

Monitoring server 116 hosts the application performance management system. Monitoring server 116 may be implemented using known hardware and software, such as a processor, a memory, communication interfaces, an operating system, etc. Monitoring server 116 may be implemented as software running on a general-purpose server. Alternatively, monitoring server 116 may be implemented as an appliance or virtual machine running on a server.

Monitoring database 118 provides a storage infrastructure for storing the application performance information processed by the monitoring server 116. Monitoring database 118 may be implemented using known hardware and software, such as a processor, a memory, communication interfaces, an operating system, etc.

Monitoring client 120 serves as an interface for accessing monitoring server 116. For example, monitoring client 120 may be implemented as a personal computer running an application or web browser accessing the monitoring server 120.

Agents 122 serve as instrumentation for the application performance management system. As shown, the agents 122 may be distributed and running on the various components of system 100. Agents 122 may be implemented as software running on the components or may be a hardware device coupled to the component. For example, agents 122 may implement monitoring instrumentation for Java and .NET framework applications. In one embodiment, the agents 122 implement, among other things, tracing of method calls for various transactions. In particular, in one embodiment, agents 122 may interface known tracing configurations provided by Java and the .NET framework to enable tracing and to modulate the level of detail of the tracing.

In one embodiment, the agents 122 may implement or include a throughput manager to allow for continuous tracing of the node or entity being monitored, such as clients 102 or application server 106. As noted, conventional tracing on a server, such as application server 106, must be initiated manually or triggered by a program condition and for only a limited period of time. Conventionally, it is considered necessary to limit trace duration and detail because the act of tracing is relatively expensive and could negatively impact performance and disk space of the application server 106.

In contrast, the embodiments permit continuous, rather than requiring intermittent, tracing of an entity. The continuous tracing may be performed for various durations. In addition, in the embodiments, the continuous tracing may be temporarily suspended. However, in one embodiment, the throughput manager in agents 122 may continue to run and re-initiate tracing when system performance allows. For example, in one embodiment, the agents 122 automatically modulate the level of detail written to meet a set of throughput goals set by the user. In one embodiment, the user, for example via monitoring client 120, may set a target data rate, such as in kilobytes per second, and a maximum amount of disk space to be used by agents 122.

Based on communal data rate measured, the agents 122 may then adjust the level of transaction method call detail written to a transaction trace file to ensure these targets are met. If the current data rate is low enough, the agents 122 allows every detail of each method call, including information tags known as properties. A property is a pair of strings comprising a name and a value. The name of a property derives from a set of strings that identify characteristics, such as method arguments, environment settings at the time of a call, etc., to be associated with each specific method call of a transaction. For example, properties such as SQL statements, database URLs, HTTP methods, etc. may be traced in the embodiments. If, however, the data rate of trace data written by agents 122 becomes excessive, the agents 122 will omit some property details, or even some method call events themselves, from the transaction trace file.

As noted, for cross-tier communications that are not encapsulated as HTTP protocol requests and responses, correlating annotations can be difficult, since it is generally not possible to insert additional context onto messages sent over network 124 by way of arbitrary TCP socket requests.

Accordingly, in one embodiment, the application monitoring system may exploit the tracing information produced by agents 122, harvest this information, and then correlate communications for transactions even if the transaction spans multiple tiers.

In particular, within each individual communicating process running on a component of the system 100 (e.g., the client 102 and/or the application servers 106), the tracing of the embodiments maintain awareness of when socket connections start and complete. For example, the agents 122 can track the local and remote ip:port pairs associated with each socket object. The local ip:port pairs uniquely identify one aspect of a particular socket during the course of a conversation.

Although these pairs are not unique indefinitely (since ports can be re-used), in one embodiment, the agents 122 assign an identifier ("ID") to each socket at the start of a conversation. The socket ID may then be made globally unique by combining it with other information, such as a process ID, node ID, and start time of the process. In one embodiment, the agents 122 send this conversation data to the collector 114 and monitoring server 116 by read and write calls on streams associated with these sockets.

The monitoring server 116 can thus identify which sockets correspond to the reads and writes on the stream. In particular, the monitoring server 116 can identify the two sockets that form the end points of a particular conversation for a transaction between two processes on different tiers and different components (such as clients 102 and application servers 106) based on the ip:port pairs.

In addition, the agents 122 may insert identifiable markers based on the content of the data being transferred to help the monitoring server 116 match the sockets on each side of a data conversation, for example, across network 122. In one embodiment, the agents 122 use checksum values emitted at selected offsets into the conversation stream, such as offsets of 100, 1000, 5000 bytes into the stream and at the end of the stream. In one embodiment, the agents 122 employ Jenkins checksums. However, any form of checksum or other type of marker may be employed.

The monitoring server 116 can thus identify the correspondence between a client transaction, which sends a message to a server and the corresponding sub-transaction on the server, which performs the processing associated with this message. Each side may have a number of socket calls associated with the transfer of the client-to-server message and also a response from the server-to-client message. The embodiments also account for when the same socket pair is re-used for multiple transactions without reconnecting.

For example, at one or more of clients 102, when a socket connection is opened, the agent 122 assigns a connection ID, which is unique within the client process for its lifetime. In one embodiment, this ID is emitted with each socket call. On each socket call when a checksum boundary is crossed, the checksum is emitted with a value as a pair, such as <offset-in-stream, checksum-value>. The bytes sent/received are also emitted on each socket call. The monitoring server 116 can then calculate the absolute offset within the stream for a particular connection ID by summing these quantities. Alternatively, the absolute offset could be emitted by agents 122 on each call.

In addition, for each socket opened, the agents 122 assign a unique socket identifier, SOCKET_ID, property value for the life of the process. Then in one embodiment, for each successful socket read and write, the agents 122 emit the SOCKET_ID, a local address value (LOCAL_ADDR), a remote address value (REMOTE_ADDR), and other information, such as amount of data received like BYTES_RECEIVED or BYTES_SENT properties. Other values associated with the call may be emitted as well by the agents 122. If a read or write call crosses a boundary, the agents 122 write the boundary value and the running checksum of all bytes from the start of socket operation to the boundary with a property, such as a property labeled SOCKETBUFHASH. An exemplary process flow is also explained with reference to FIG. 2.

Network 124 serves as a communications infrastructure for the system 100. Network 124 may comprise various known network elements, such as routers, firewalls, hubs, switches, etc. In one embodiment, network 124 may support various communications protocols, such as TCP/IP. Network 124 may refer to any scale of network, such as a local area network, a metropolitan area network, a wide area network, the Internet, etc.

Figure 2:
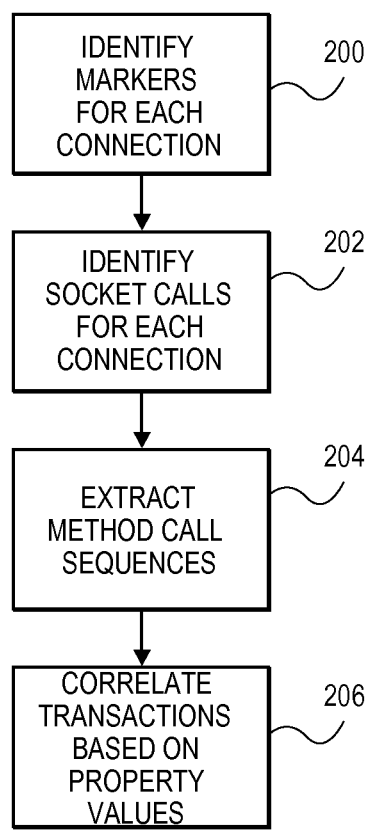
FIG. 2 illustrates an exemplary process flow in accordance with the embodiments.

FIG. 2 illustrates one embodiment of an exemplary process flow for correlating communications across a multi-tier application. As noted, transactions in such multi-tier applications may involve communications between a variety of entities. A client may initially communicate with a web server, this web server may then communicate with an application server, and then the application server may communicate with a database server, and so forth. As described below, the embodiments can correlate these communications between the multiple tiers of an application and provide an improved visibility of an application's performance. For purposes of illustration, an exemplary process flow is provided for correlating multiple tiers of communications between client 102, the application server 106, etc.

In phase 200, the monitoring server 116 identifies the markers, such as the checksums written by a client program, such as agents 122, at client 102, associated with the connection ID for the client socket calls in the transaction. In one embodiment, the monitoring server 116 employs an index. The index key may be <node, process, connection ID>, and the value is the associated set of checksums for that connection ID. The monitoring server 116 maintains the index keyed on checksums where the stored value is the <node, process, connection ID, time the checksum was created>. If a lookup by the monitoring server 116 produces multiple matches, the monitoring server 116 based on time can disambiguate these matches.

In phase 202, based on the <node, process, connection ID>, the monitoring server 116 then identifies the correct socket calls associated with that connection, for example, based on the connection ID. In one embodiment, the monitoring server 116 maintains an index that is keyed on <node, process, connection id>, where the stored values are the data associated with each socket call for the connection <tracefile+transaction, offset-within-stream>. The monitoring server 116 performs a lookup to find all socket calls associated with the connection concerned, based on the corresponding range of stream offsets.

As noted above, the agents 122 that assigned a unique SOCKET_ID property value for the life of the process and for each successful socket read and write, emitted the SOCKET_ID, LOCAL_ADDR, REMOTE_ADDR and BYTES_RECEIVED or BYTES_SENT properties and values associated with the call. In addition, if a read or write call crosses a boundary, the agents 122 have written the boundary value and the running checksum of all bytes from the start of socket operation to the boundary with a SOCKETBUFHASH property.

In phase 204, the monitoring server 116 processes the trace output of the agents 122 and extracts the method call sequences comprising each identifiable transaction in the trace data and tags each transaction with the properties associated with each method call of the transaction. In the case of transactions involving socket input/output ("I/O"), these properties may include those generated by agents 122 as described above.

Call sequences are stored in a database 118 by monitoring server 116 and are indexed by their various property values, as well as timestamps. The database 118 may also be made available to monitoring client 120.

In phase 206, at monitoring client 120, a user may filter transactions dynamically by selected criteria for transactions based on property values. In some embodiments, when displaying a transaction to the monitoring client 120, the monitoring server 116 may examine transactions for possible relationships based on matching against the algorithm described above. If relationships are inferred by heuristic matching of HTTP custom header or socket checksum properties, then the related transactions can be correlated together by the monitoring server 116 and displayed as if they were a single transaction whose method call sequence spans the tiers between the related transactions.

The foregoing merely illustrates the principles of the invention. It will thus be appreciated that those skilled in the art will be able to devise various arrangements which, although not explicitly described or shown herein, embody the principles of the invention and are thus within its spirit and scope. Other system configuration and optimization features will be evident to one of ordinary skill in the art in view of this disclosure, and are included within the scope of the following claims.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of marking a transaction at a first node for correlation with a related transaction at a second node, said method comprising:
   determining when a socket connection is opened by the first node for a communication destined to the second node;
   assigning a connection ID to the socket connection;
   emitting the connection ID responsive to a successful socket write action by the first node;
   emitting, at offsets within the communication, respective markers for each of the offsets, wherein each offset corresponds to a number of bytes from a start of the socket connection; and
   maintaining an index that is keyed on the markers and a timestamp indicating when each marker was created, wherein the markers correspond to checksum values.

2. The method of claim 1, further comprising emitting an amount of data sent and an amount data received for each socket connection.

3. The method of claim 1, wherein emitting the respective markers comprises emitting a checksum value calculated based on the offset.

4. The method of claim 1, wherein emitting the checksum value comprises emitting a Jenkins checksum value based on the offset.

5. The method of claim 1, wherein emitting the respective markers comprises emitting a checksum and the offset as a pair value.

6. A method for correlating communications between a first node and a second node for a transaction, said method comprising:
    monitoring a plurality of method calls and a plurality of socket actions at the first and second nodes;
    assigning a socket ID to each socket connection that is opened on the first and second nodes;
    emitting, for each successful socket write action and each successful socket read action at the first and second nodes, the socket ID and respective marker corresponding to an offset within the connection, wherein each offset corresponds to a number of bytes from a start of the socket connection;
    maintaining an index that is keyed on the markers and a timestamp indicating when each marker was created, wherein the markers correspond to checksum values; and
    correlating the communications between the first and second nodes based on the socket ID and the respective markers.

7. The method of claim 6, wherein emitting the respective markers corresponding to an offset within the connection comprises emitting a checksum value calculated based on the offset.

8. The method of claim 6 further comprising emitting, for each successful socket write action, a local address, a remote address, a number of bytes sent, and a checksum value.

9. The method of claim 6, further comprising emitting, for each successful socket read action, a local address, a remote address, a number of bytes received, and a checksum value.

10. The method of claim 6, further comprising recording each of the plurality of method calls and their corresponding emissions to a database.

11. The method of claim 6, further comprising maintaining an index that is keyed on identifiers for the first and second nodes, an identifier for each process associated with the method calls, and an identifier for the socket connection.

12. The method of claim 6, wherein correlating the communications between the first and second nodes based on the socket ID and the respective markers comprises a lookup for socket calls matching the socket ID and a corresponding range of markers.

13. The method of claim 6, wherein correlating the communications between the first and second nodes based on the socket ID and the respective markers comprises a lookup for socket calls matching the socket ID and a corresponding range of checksum values calculated for offsets within the communications.

14. A method for correlating a transaction recorded at two or more nodes, comprising:
    monitoring a plurality of method calls and a plurality of socket actions for transactions at each of the two or more nodes;
    associating a socket with each socket connection that is opened;
    for each successful socket connection, emitting the socket, a local address, and a remote address;
    for each successful socket write action, emitting the socket, a current output stream offset, a number of bytes sent, and on selected fixed boundaries and at the end of a socket connection a checksum value, wherein each offset corresponds to a number of bytes from a start of the socket connection;
    for each successful socket read action, emitting the socket, a current input stream offset, a number of bytes received, and on selected fixed boundaries and at the end of a socket connection, a checksum value;
    associating each emission with at least one of the plurality of method calls;
    recording information about each of the plurality of method calls and their corresponding emissions;
    maintaining an index that is keyed on checksum values and a timestamp indicating when each checksum value was created; and
    identifying a correlation between at least two of the plurality of method calls based on the recorded information.

15. The method of claim 14, wherein identifying the correlation comprises determining a relation between at least two of the plurality of method calls based on a heuristic matching of the emitted checksums.

16. The method of claim 14, wherein identifying the correlation comprises determining a relation between at least two of the plurality of method calls based on a heuristic matching of custom headers.

17. The method of claim 14, further comprising displaying transactions related to correlated method calls as a single transaction to a user.

18. The method of claim 17, wherein displaying transactions related to correlated method calls as a single transaction to a user comprises displaying the single transaction with method calls that span between the first and second nodes.

19. A first node configured to mark a transaction for correlation with a related transaction at a second node, said first node comprising:
    a memory comprising executable program code; and
    a processor configured by the executable program code to determine when a socket connection is opened by the client for a communication destined to the second node, assign a connection ID to the socket connection, emit the connection ID responsive to a successful socket write action by the first node, emit, at offsets within the communication, respective markers for each of the offsets, wherein each offset corresponds to a number of bytes from a start of the socket connection, and maintain an index that is keyed on the markers and a timestamp indicating when each marker was created, wherein the markers correspond to checksum values.

20. The first node of claim 19, wherein the processor is configured to emit an amount of data sent and an amount data received for each socket connection.

21. The first node of claim 19, wherein the processor is configured to emit a checksum value calculated based on the offset.

22. The first node of claim 19, wherein the processor is configured to emit a Jenkins checksum value based on the offset.

23. The first node of claim 19, wherein the processor is configured to emit a checksum and the offset as a pair value.

24. A system configured to correlate communications between a first node and a second node for a transaction of an application running over a network, said system comprising:
    a communications interface coupled to the network and configured to receive trace information from at least the first and second nodes;

a processor;

a non-transitory computer-readable medium having computer-readable instructions executable by a computer such that, when executing said instructions, a computer will perform a computer-implemented method for correlating communications between a first node and a second node for a transaction of an application running over a network, the method comprising: monitoring a plurality of method calls and a plurality of socket actions for transactions at each of the two or more nodes, associating a socket ID with each socket connection that is opened, wherein for each successful socket connection, the socket ID, a local address, and a remote address has been emitted by the first and second nodes, wherein for each successful socket write action, the socket ID, a current output stream offset, a number of bytes sent, and on selected fixed boundaries and at the end of a socket connection a checksum value has been emitted by the first and second nodes, wherein each offset corresponds to a number of bytes from a start of the socket connection, wherein for each successful socket read action, the socket ID, a current input stream offset, a number of bytes received, and on selected fixed boundaries and at the end of a socket connection, a checksum value, has been emitted by the first and second nodes, associating each emission with at least one of the plurality of method calls, record information about each of the plurality of method calls and their corresponding emissions, maintaining an index that is keyed on checksum values and a timestamp indicating when each checksum value was created, and identifying a correlation between at least two of the plurality of method calls based on the recorded information.

25. The system of claim 24, wherein the processor is configured to determine a relation between at least two of the plurality of method calls based on a heuristic matching of the emitted checksums.

26. The system of claim 24, wherein the processor is configured to determine a relation between at least two of the plurality of method calls based on a heuristic matching of custom headers.

27. The system of claim 24, wherein the processor is configured to provide information for displaying transactions related to correlated method calls as a single transaction to a user.

28. The system of claim 27, wherein the processor is configured to provide information for displaying the single transaction with method calls that span between the first and second nodes.

* * * * *